United States Patent [19]

Castano Pinto et al.

[11] Patent Number: 5,598,445
[45] Date of Patent: Jan. 28, 1997

[54] JITTER REDUCTION SYSTEM IN DIGITAL DEMULTIPLEXERS

[75] Inventors: Francisco J. Castano Pinto, Tres Cantos; José V. Rodriguez Beato, Madrid, both of Spain

[73] Assignee: Alcatel N.V., Rijswijk, Netherlands

[21] Appl. No.: 412,129

[22] Filed: Mar. 28, 1995

[30] Foreign Application Priority Data

Mar. 28, 1994 [ES] Spain ..................... 9400667

[51] Int. Cl.⁶ ............ H04L 7/00; H04L 25/36; H04L 25/40
[52] U.S. Cl. .......................... 375/372; 370/506
[58] Field of Search ........................ 375/372, 376; 370/102, 108, 105.3; 331/18, 25, 1 A, 14; 395/877

[56] References Cited

U.S. PATENT DOCUMENTS

| | | | |
|---|---|---|---|
| 4,764,942 | 8/1988 | Shigaki et al. | 375/372 |
| 5,033,064 | 7/1991 | Upp | 375/372 |
| 5,052,025 | 9/1991 | Duff et al. | 375/372 |
| 5,126,693 | 6/1992 | Gulliver et al. | 331/14 |
| 5,200,982 | 4/1993 | Weeber | 375/118 |
| 5,263,057 | 11/1993 | Nawrocki et al. | 375/372 |
| 5,267,236 | 11/1993 | Stephenson et al. | 370/84 |
| 5,272,703 | 12/1993 | Peters | 370/102 |
| 5,276,715 | 1/1994 | Giuseppina et al. | 375/372 |
| 5,285,206 | 2/1994 | Peters et al. | 341/100 |
| 5,313,502 | 5/1994 | Nawrocki et al. | 375/372 |
| 5,349,310 | 9/1994 | Rieder et al. | 331/18 |
| 5,359,605 | 10/1994 | Urbansky et al. | 370/102 |
| 5,367,545 | 11/1994 | Yamashita et al. | 375/372 |
| 5,402,452 | 3/1995 | Powell et al. | 375/372 |
| 5,404,380 | 4/1995 | Powell et al. | 375/363 |
| 5,457,717 | 10/1995 | Bellamy | 375/372 |

FOREIGN PATENT DOCUMENTS

| | | |
|---|---|---|
| 458186 | 11/1991 | European Pat. Off. . |
| 455963 | 11/1991 | European Pat. Off. . |
| 4014814 | 11/1991 | Germany . |
| 9201344 | 1/1992 | WIPO . |

OTHER PUBLICATIONS

"Jitter in Digital Transmission Systems", P. Trischitta et al, Artech House, ISBN 0-89006-248-X, chapter 5, pp. 103-139.

*Primary Examiner*—Wellington Chin
*Assistant Examiner*—Paul Loomis
*Attorney, Agent, or Firm*—Ware, Fressola, Van Der Sluys & Adolphson

[57] ABSTRACT

An elastic read-write memory subassembly (EM, WP, WA, RP, RA), whose read clock (RCK) varies its frequency with a signal provided by a phase detector (PHC) as a function of the difference in time at which two pointers, for read (RP) and write (WP), take respective reference values reduces jitter in the read pointer (RP) by comparing at the instant at which the write pointer (WP) takes the write reference value it leads or lags by one write clock cycle (WCK) with respect to previous periods and, in the event this reference is increased or decreased in the same number of units, so that there is no abrupt change in the direct current component of the output signal of the phase detector (PHC); instead gradually and in fractions of the read reference, it is incremented or reduced in order to produce a smooth variation in the frequency of the read clock (RCK) that compensates the differences in net data output and input streams of the elastic memory (EM).

4 Claims, 3 Drawing Sheets

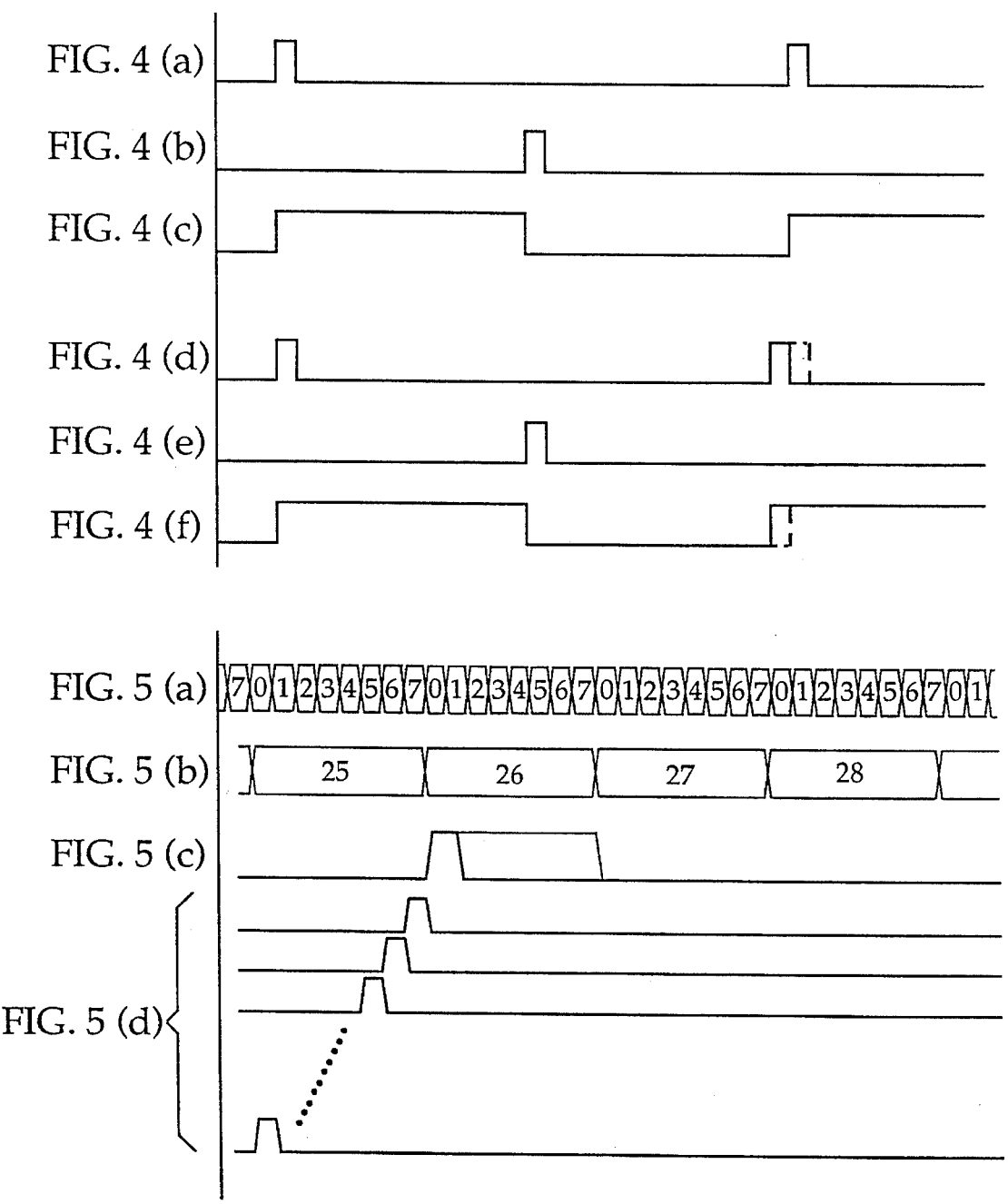

JITTER REDUCTION SYSTEM IN DIGITAL DEMULTIPLEXERS

TECHNICAL FIELD

The invention relates to the Synchronous Optical Network (SONET) or Synchronous Digital Hierarchy (SDH) and, more particularly, to reducing jitter in network elements.

BACKGROUND OF THE INVENTION

This invention concerns a system for reducing phase fluctuations or jitter in synchronous digital transmission systems in which demultiplexing is done of a group of binary channels with a determined transmission rate, also termed tributaries, starting from a single binary channel of higher order in the digital hierarchy. The tolerances in the clock frequencies that determine the transmission rates of each of the tributary channels as well as the one of the channel of higher hierarchy require the use of certain justification mechanisms during the process of tributary multiplexing, and of frequency adjustment in some of the clocks of these tributaries when they are being demultiplexed.

It is of special application in the demultiplexing of tributary channels in the SONET and in the Synchronous Digital Hierarchy when extracting the tributary channels from the corresponding channel of higher order in the digital hierarchy when there are strict limitations in the value of jitter in any of the tributary channels in question.

In synchronous digital transmission systems, channels at a determined data rate are combined or multiplexed to form a channel of higher order in the digital hierarchy. This channel of higher hierarchical order is formed, for each frame, by a frame of each tributary plus additional information termed the path overhead in which are included justification bits that permit the absorption of excessive or insufficient net information streams in the incoming frames of each tributary, produced as a result of the clock tolerances of each channel.

These bits are obtained by justification mechanisms, normally of bits or bytes, that compensate for the excess of input information of the corresponding tributary channel by means of negative justification, consisting of transmitting the excess information bits of the tributary in what are termed justification bits and indicating this situation with other justification control bits. In a similar manner, when there is insufficient input information in a tributary channel, positive justification is done, which basically consists of marking certain bits, which normally carry information, as vacant.

These techniques are used, as has already been indicated, in a path in which lower order plesiochronous tributaries are combined to form a higher order channel. This higher order channel has its own fixed frequency clock, for which reason the differences with the corresponding tributary clocks are taken up by means of the justification mechanisms mentioned.

In the inverse process, in which there is a higher order channel from which several tributaries have to be obtained, there are other mechanisms that permit the net data streams to be maintained, at both the input and the output, for the correct operation of the digital transmission system.

These mechanisms are constituted by the use of "elastic memories" as explained in the book "Jitter in Digital Transmission Systems" by Patrick R. Trischitta and Eve L. Varma, published by Artech House with ISBN 0-89006-248-X, chapter 5, pages 103–139.

In this publication, FIG. 5.10 shows in graphical form how a tributary is obtained from a channel of higher hierarchical order in which there are two pointers, one for writing and one for reading, that operate cyclically on the same memory, in which the write pointer has control of the storage addresses of the input data entering this memory, and the read one has control of the read addresses for obtaining the output data.

The write pointer is formed by a cyclic counter that is incremented according to a write clock signal, which is blocked when bits are detected that do not belong to the tributary in question; that is, it detects path overhead, information from other tributaries, or else empty justification bytes or groups of eight justification bits, also empty.

In this way, though not with a steady flow, the memory holds, in a sequential and cyclic form, only the information bits of the corresponding tributary.

Simultaneously, the read pointer, which is another cyclic counter, is incremented in accordance with a read clock signal in order to proceed with the extraction of the information data of the corresponding tributary.

When, as a consequence of the tolerances in the read and write clock frequencies, small differences arise in these, then one of the two pointers would catch up with the other so that all the information entering the memory could not be read and there would be a loss, or else the amount of information read would be greater than that entering and there would be a loss of control of the available information.

To overcome this problem, a frequency control technique is used in the read pointer clock, as is shown in FIG. 5.10 of the publication mentioned.

This technique, as is explained, consists in obtaining a phase comparison signal, normally at 180°, from two signals obtained from the read and write pointers respectively, when these pass through a determined reference value for each case. This comparison signal is filtered and applied to a voltage controlled oscillator which serves to generate the clock signal with which the read pointer works. In this manner, if the read pointer, or data output, is delayed with respect to the write pointer, the read clock frequency is increased in order to compensate the delay.

Similarly, if the read pointer is fast, the read clock frequency is reduced to compensate the advance.

Nevertheless, despite the assurance that the net amount of information that leaves the memory is the same as that which enters, the relative leads and lags in the phase comparison signals mentioned, mainly due to the justification mechanisms, produce a phase noise or jitter which can surpass the permissible values according to the standards set for the Synchronous Digital Hierarchy.

Although at first sight it could be imagined that this can be achieved by narrowing the passband of the lowpass filter at the input to the voltage controlled oscillator, this would produce locking-on problems in the phase-locked loop circuit, and consequently this solution does not appear acceptable for this system.

DISCLOSURE OF INVENTION

The technical problem therefore lies in achieving a reduction in the phase noise or jitter in the Synchronous Digital Hierarchy output tributary data stream such that the strict limitations are satisfied with respect to the jitter permitted by the various standards.

The system according to the invention comprises an elastic read-write memory subassembly for obtaining tributary channels in digital demultiplexers that reduces the jitter in the data recovered from a channel of higher hierarchical order. This assembly is based on the use of a read clock for the memory that varies its frequency in accordance with the control signal produced by a phase detector as a function of the difference in the times when two pointers, one for writing and the other for reading, respectively reach determined reference values, Rref, Wref. The basic characteristic of this system is that when, in an elastic memory fill cycle, the instant at which the write pointer reaches the write reference value Wref is ahead or is behind by at least one write clock cycle with respect to preceding periods, said reference is increased or decreased by this same number of units, so that there is no abrupt change in the direct current component of the output signal from the phase detector, but, by means of fractions of the read reference Rref, the latter is increased or decreased gradually, accordingly, in order to produce a smooth change in read clock frequency that compensates for the changes in the amount of information contained in the elastic memory.

In a similar fashion, and based on the same generic concept, it is possible to keep the read reference constant, and make it the write reference Wref that is increased or decreased in a gradual manner in order to produce the smooth changes in the read clock frequency and compensate the same effect as before.

These and other objects, features and advantages of the present invention will become more apparent in light of the detailed description of a best mode embodiment thereof, as illustrated in the accompanying drawing.

BRIEF DESCRIPTION OF THE DRAWING

FIGS. 4(a)–(f) show timing charts on a common timeline of the input and output signals of the phase comparator of the block diagrams of FIGS. 1 and 2; and FIGS. 5(a)–(d) show timing charts on an expanded timeline of the input and output signals of the block diagram of FIG. 2.

BEST MODE FOR CARRYING OUT THE INVENTION

Figure 1:
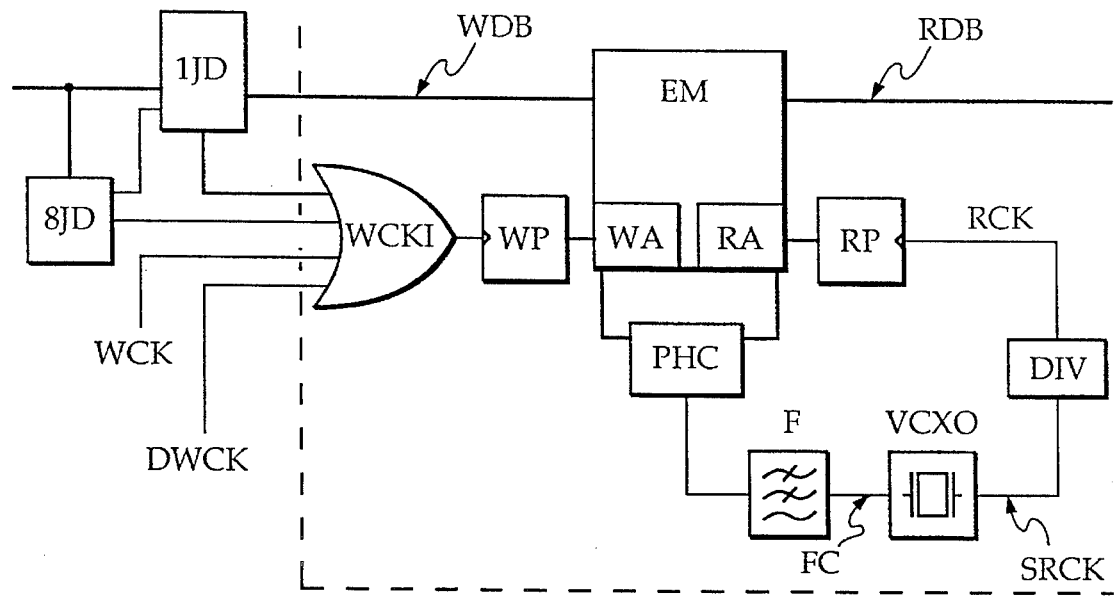
FIG. 1 is a block diagram of a demultiplexing system for a tributary of the synchronous digital hierarchy or SONET that makes use of an elastic memory in accordance with the state of the art.

A preferred implementation, according to the invention, is based on the recognised block diagram of the state of the art shown in FIG. 1. In this figure, an elastic memory EM is shown with a size 64×8, that is, 64 words with 1 byte each. Into this memory words appearing on a write data bus WDB can be written into write addresses WA indicated by a write pointer WP. This write pointer is formed by a module-64 cyclic counter.

To increase the value of this write pointer, the latter receives a clock signal at a frequency one eighth of that of the digital hierarchy bit rate being received, so that all the bits transmitted are stored in the elastic memory EM grouped in eight-bit words.

Simultaneously, in other different modules (not shown), frame detection, tributary selection, etc. take place, so that a write clock disable control signal DWCK is generated which blocks the write clock signal WCK at an inhibit gate of clock WCKI when the eight bits present on the write data bus WDB do not belong to the tributary to be recovered.

In addition, the justification indicator bits at the byte level are examined in a byte justification detector 8JD so that the write clock WCK is also blocked when there is a positive justification byte. At bit level, there is also a is bit justification detector 1JD that progressively stores on a temporary basis the parallel input data and presents at its output the eight-bit words grouped consecutively by means of the necessary displacement that depends on the justified bits.

In this way, when an extra bit appears at a given moment in a complete frame (due to the bit justification mechanism), the latter is temporarily stored so that, along with the first seven bits of the following byte corresponding to the same tributary, an eight-bit word can be completed which will be stored in the elastic memory EM. The bit justification detector 1JD also blocks the write clock WCK so that a new word is not written into memory until it is complete.

On the read side, in like manner, there is a read pointer RP similar to the write one, for reading the words stored on a read address RA of the elastic memory EM. These words are present on the read data bus RDB.

The read pointer RP is also formed by a cyclic counter of the same module as the memory size; it is increased in accordance with a read clock RCK at a rate that is one eighth that of the serial output data. This clock is obtained from a serial read clock SRCK by dividing the frequency by eight in a divider DIV, which is formed by a module-8 digital counter.

The serial read clock SRCK is obtained from a voltage controlled crystal oscillator VCXO to which is applied a frequency control signal FC to increase or decrease its frequency of oscillation slightly with the object of keeping the frame mean data flow of input bits to the elastic memory EM equal to their output flow from it. To achieve this, there is also a phase comparator PHC that generates a digital signal the direct current component of which, obtained through a lowpass filter F, is the actual frequency control signal FC.

The phase comparator PHC performs the following functions:

generates a first internal signal that adopts a high level when the write address reaches a determined reference value Wref, as is indicated in FIG. 4(a), generates a second internal signal that adopts a high level when the read address reaches another determined reference level Rref, as is shown in FIG. 4(b), from the two signals mentioned, a third signal is obtained that is high when the rising edge of the first of these arrives and low when the rising edge of the second arrives.

In this way, the direct current component of this signal depends on the duration ratio between the high and low periods of the signal so obtained as is indicated by FIG. 4(c).

When an extra byte appears in a frame as a consequence of negative justification, the position of the high level pulse of the first internal signal of the phase comparator PHC is advanced by one write clock period WCK because the write reference value Wref is reached one clock cycle before it was expected, as can be seen from FIG. 4(d), while in the second internal signal there is still no change, as can be seen from FIG. 4(e) as compared to FIG. 4(b).

As a consequence of this, the duration of the low level of the output signal from the phase comparator has been shortened a little in the next period as shown in FIG. 4(f); this, even after the filter F, appears as a rounding of the frequency control signal FC that is applied to the input of the VCXO producing a variation in its frequency of oscillation that finally results in phase fluctuations or jitter. This is made worse by the fact that compensation is being done simultaneously in shifts equivalent to 8 bits, which are those that hold each word in the elastic memory EM.

Figure 2:
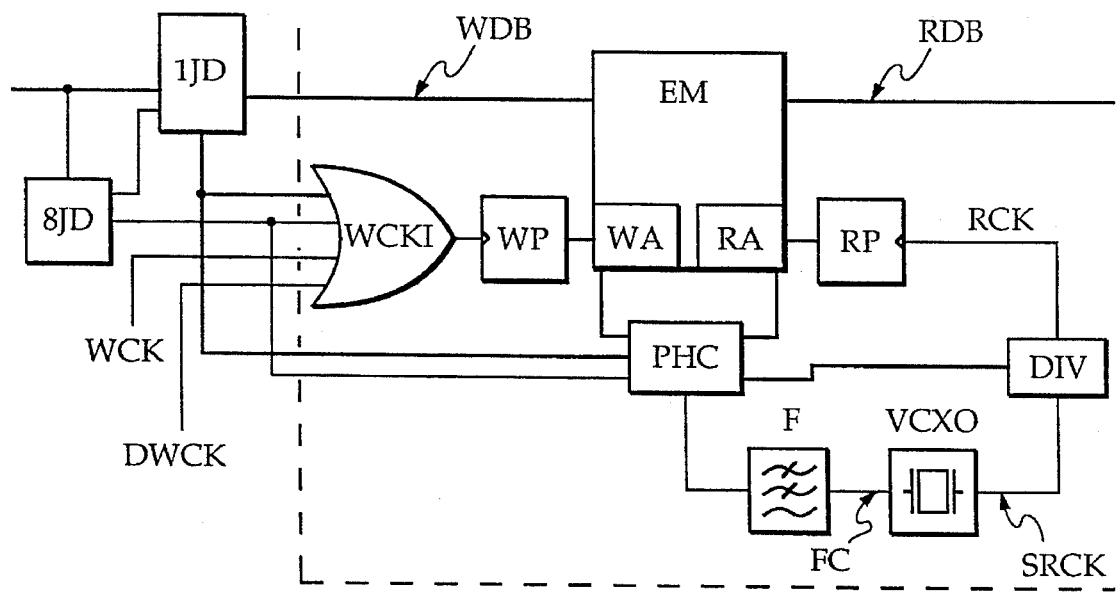
FIG. 2 shows a block diagram of a demultiplexing system according to the invention.

In FIG. 2 it is shown the block diagram which, according to the invention, achieves a reduction in the jitter in the recovered tributary.

For this, the output signal from the VCXO that generates the serial reading clock SRCK is passed through a frequency divider DIV, which divides it by eight.

Figure 3:
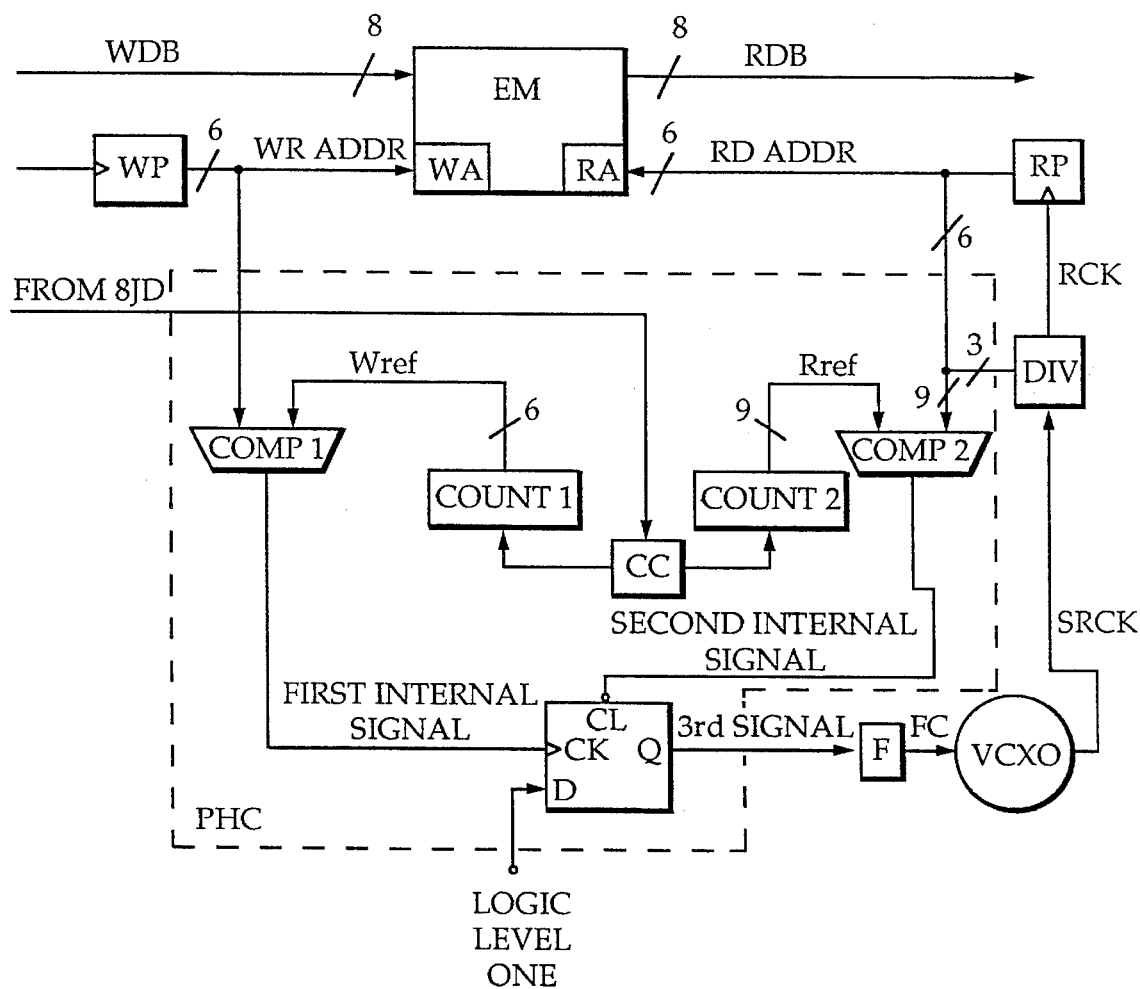
FIG. 3 shows the phase comparator of FIG. 2 in more detail according to the invention.

This divider is formed by a 3-bit counter so that the three outputs from it are also sent to the phase comparator PHC (this differs from the previous case in that the read reference word Rref has three bits more as shown in FIG. 3) in order to identify the eight fractions of the read clock period RCK. For this reason the phase comparator PHC can have control not only of when the read pointer RP reaches the read reference value Rref, but also of the fractions of the read clock cycle RCK, among the eight possible, through which the second internal signal of the phase detector progresses. This is shown in FIG. 5(a), in which the illustrated waveform indicates the value of the three bits of the 8-bit counter that constitutes the frequency divider DIV.

The waveform of FIG. 5(b) indicates the read address RA that is being taken by the read pointer RP; FIG. 5(c) shows the waveform and position of the pulse of the second internal signal obtained by the phase comparator PHC in accordance with the state of the art (wide pulse) when the read reference is 26 and according to the invention (narrow pulse); finally, FIG. 5(d) illustrates the gradual progression (⅛ of the read clock period) of the second internal signal of the phase comparator PHC that the latter uses to provide the third signal that is provided to the lowpass filter (F) to obtain the frequency control signal FC provided to the voltage controlled oscillator.

FIG. 3 represents in more detail a Phase Comparator PHC such as may be used in FIG. 2 in a demultiplexing system that makes use of the invention. The so-called elastic memory EM may be a dual-port memory such as commonly used in some specific fields like FIFO (First In First Out) memories for example. Basically it differs from conventional memories in that it has two address buses and two data buses and therefore, it allows one to read and to write simultaneously without any conflict when both addresses are different from each other.

In the implementation shown, the size of this memory is sixty-four bytes (the address buses have six bits and the data buses have eight bits).

The phase comparator PHC is implemented, in a more detailed way, as indicated. It has two comparators of six and nine bits, respectively COMP1 and COMP2, that produce a high level output pulse when both inputs are equal.

COMP1 receives the write address and a write reference value (Wref) from an up/down six-bit counter (COUNT1); and COMP2 receives the six-bit read address plus the three-bit output of DIV and a read reference value (Rref) from an up/down nine-bit counter (COUNT2).

The Output of these comparators (COMP1 and COMP2) are applied to a D-type flip-flop in the following way: the data input of this flip-flop is set to a digital "1", the output of COMP1 is sent to the clock input (CK) and the output of COMP2 is sent to the clear input (CL). In this way, when the write address reaches the write reference value, the output of the flip-flop is set to digital "1" and when the read address reaches the read reference value, is set to a digital "0".

According to the prior art, and as can be seen from FIG. 4(f), the variation of DC voltage that is applied to the VCXO corresponds to an 8-bit compensation (one memory word) that modifies the frequency of the VCXO to compensate the reading rate in order to balance both writing and reading rate. This 8-bit correction produces a significant "jitter" in the read clock.

For this reason, the phase comparator disclosed for carrying out the invention includes a control circuit (CC) that modifies the content of both counters (COUNT1 and COUNT2) when a justification byte or eight justification bits appear.

This control circuit receives the indication from the justification detectors (1JD) and (8JD) that a byte justification (or 8-bit justification) has been detected and therefore the write reference value will be reached one write clock period before or later, depending whether the justification was negative or positive.

If the write reference value Wref is going to be reached, for instance, one write clock period after, the control circuit (CC) decrements one unit the content of COUNT1 in such a way that the output pulse from comparator COMP1 appears in the same instant as if there were no justification and therefore no DC variation is applied to the VCXO.

Then, the counter COUNT2 has its value decremented in one unit. This unit corresponds to ⅛ of that from the counter COUNT1 because its frequency input is 8 times faster and divided by 8 in a 3-bit counter as shown in FIG. 3.

In this way, the output pulse produced by the comparator COMP2 has gone ahead ⅛ of the read clock period and the DC variation that is applied to the VCXO is much more slight that in the prior art.

This process is repeated until 8 times (see FIG. 5(d)) with a uniform distribution (although not 8 times consecutively).

With these changes, the phase comparator PHC works in principle in a similar manner but with the following differences:

when the byte justification detector 8JD detects an extra byte or when the bit justification detector 1JD detects eight bits, occurring as a result of negative justifications, it increases the write reference value Wref by one unit; in this way the position of the high level pulse of the first internal signal of the phase comparator PHC is not altered;

the value of the read reference Rref is increased by a fraction of a unit so that the position of the high level pulse of the second internal signal of the phase comparator is advanced by a fraction of a cycle of the read clock RCK; this is repeated on eight occasions in different cycles of the read clock RCK distributed over a relatively long period of time, on the eighth time that this process is carried out, the read reference Rref is increased by one unit, so that, once this situation has been reached, both the write reference Wref and the read reference Rref are restored to a state of equilibrium.

In this way, instead of making a major variation in the frequency of the read clock RCK via the phase detector PHC, filter F and oscillator VCXO that compensates for an 8-bit excess in information in a single step, what is done is to provoke small variations that result in much smaller fluctuations in phase.

To optimise the reduction in jitter even more, the system can be designed so that the moments when increments in the read reference Rref take place, are uniformly distributed between the occurrence of two byte justification detections (or of 8 detections of bit justifications). For this, the phase detector PHC can have another counter that counts the time elapsed between each of the two consecutive detections of those indicated above and carries out the corresponding variations of the read reference Rref each eighth part of this time starting from the moment when the second of these two detections was received.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. Jitter reduction system for a digital demultiplexer, comprising an elastic read-write memory subassembly (EM, WP, WA, RP, RA), having a read clock (RCK) that is varied in frequency in accordance with a control signal (FC) that is obtained from a phase detector (PHC) as a function of a difference in times when a read pointer (RP) and a write pointer (WP) each take, respectively, determined read reference value (Rref) add write reference value (Wref), wherein when in a cycle of an elastic memory (EM) of the elastic read-write memory subassembly, an instant when the write pointer (WP) takes the write reference value (Wref), leads or lags, with respect to previous periods, by at least one write clock cycle (WCK), the write reference value is increased or decreased by this same number of clock cycles, so that a direct current component of an output signal of the phase detector (PHC) is not altered abruptly, but the read reference (Rref), is accordingly increased or decreased gradually in fractions of a read clock (RCK) period, in order to produce a smooth increment or decrement in the frequency of the read clock (RCK) that compensates for differences in filling and emptying rates of the elastic memory (EM).

2. System according to claim 1 wherein instead of gradually advancing or retarding the read reference (Rref) in fractions of the read clock (RCK) period, the read reference is kept constant and it is the write reference (Wref) that is put forward or back gradually in order to produce a smooth increase or decrease of the frequency of the read clock (RCK).

3. System according to claim 1 wherein the instants when the read reference is increased or decreased in a fraction of a period of the read clock (RCK) have been uniformly distributed in an interval of time between moments of detection of two consecutive justifications.

4. System according to claim 2 wherein instants when the write reference is increased or decreased in a fraction of a period of the write clock cycle (WCK) are uniformly distributed in an interval of time between moments of detection of two consecutive justifications.

* * * * *

UNITED STATES PATENT AND TRADEMARK OFFICE
CERTIFICATE OF CORRECTION

PATENT NO. : 5,598,445
DATED : January 28, 1997
INVENTOR(S) : Castano Pinto et al It is certified that error appears in the above-indentified patent and that said Letters Patent is hereby corrected as shown below:

At Item [57], line 10, please cancel "the" and substitute --that-- therefor.

At column 7, line 26 (claim 1, line 8), please cancel "add" and substitute --and-- therefor.

Signed and Sealed this

Twentieth Day of May, 1997

Attest:

BRUCE LEHMAN

Attesting Officer   Commissioner of Patents and Trademarks